Patented Sept. 15, 1953

2,652,383

UNITED STATES PATENT OFFICE 2,652,383

POLYESTER RESIN COMPOSITIONS AND PROCESS OF PREPARING SAME

John F. Davis, Stamford, Conn., assignor to American Cyanamid Company, New York, N. Y., a corporation of Maine No Drawing. Application January 5, 1950, Serial No. 137,040

8 Claims. (Cl. 260—44)

This invention relates to novel compositions of matter and, more particularly, to surface-coating materials comprising unsaturated polyester resins modified with certain phenolic resins whereby one may produce a coating composition which is capable of yielding, on curing, a crater-free film. This invention further relates to surface-coating materials comprising unsaturated polyester resins, which have been modified by the addition of comparatively small amounts of phenol-formaldehyde resins such as the acid-catalyzed reaction products produced by reacting formaldehyde with p-tertiary butyl phenol, p-secondary butyl phenol, and o-tertiary amyl phenol or the alkaline product produced by reacting formaldehyde with p-tertiary butyl phenol, p-secondary butyl phenol, and o-tertiary amyl phenol, whereby the methylol phenol-formaldehyde resins are produced. This invention further relates to laminating materials, molding compositions, and other resinous products which have exposed surface areas, where cratering defects would be undesirable.

One of the objects of the present invention is to produce a surface-coating material by the use of mixtures of unsaturated alkyd resins and compounds having at least one $CH_2=C<$ group which are capable of producing, on curing, a crater-free film while retaining all of the other desirable characteristics, which these polyester resins inherently possess. A further object of the present invention is to produce surface-coating materials which have improved hardness, acid and alkali resistance, improved resistance to solvents, excellent gloss and color retention. A still further object of the present invention is to produce polyester surface-coating materials, which may be baked or air-dried and which are substantially free from all crater-like defects. These and other objects of the present invention will be set forth hereinbelow in greater detail in the further description of the present invention.

The use of polyester resins as surface-coating materials has been known in the art and may be prepared according to processes set forth in the Kropa U. S. Patents 2,443,735–41 inclusive, and 2,409,633. These polyester resins have many desirable characteristics, but under certain conditions of application and use, they display a tendency to produce crater-like defects, which tend to reduce in scope the field to which they may be applied. This defect of cratering, as it is most commonly called, is sometimes referred to as crawling or pinholding but a more general description of the phenomenon as experienced in the application of these polyester coating compositions is in the occurrence of depressions of varying intensity which occur on the surface of the coated film, giving said surface an unattractive appearance.

When these films are applied as a surface-coating material to a substratum base, there is sometimes formed a protuberance building up in the film around a small particle of foreign matter, which may be present on the surface of the material being coated or it may be present in the coating material itself in the nature of a piece of lint, dust, and the like. Sometimes these protuberances simply extend above the average plane surface of the coated film. This phenomenon is normal and not too objectionable, because it is correctable by ordinary surface treatment such as sanding or polishing. There are other times, however, when the protuberance formed around a piece of foreign matter is accompanied by and surrounded by a crater-like depression on the surface of the coated film. This surface defect is highly objectionable for a number of reasons. First, because it cannot be corrected readily by ordinary surface treatment such as by sanding or polishing. Secondly, because the crater-like depression will reflect light and this reflection of light emphasizes and exaggerates the defect. These crater-like depressions, whether caused by the presence of a piece of foreign matter or whether they are resulting from other causes, may be slight or very deep. This phenomena of cratering is sometimes so marked that the depression extends virtually to the substratum. Sometimes these depressions are so numerous, so aggravated, so large, and so deep that a lesser portion of the substratum surface is covered with protective film than that which is coverel by crater-like defects. Again, in these instances, these depressions in the surface film are emphasized when reflected light causes them to appear to be of greater size and depth than what is actually the fact. All of these crater-like defects are highly objectionable in surface-coating materials and the elimination of these defects by the practice of the process of the present invention enhances the characteristics of these polyester resins by a still further and very important attribute.

Among the reactive resins used in the practice of this invention for interaction with the polymerizably reactive material containing the $CH_2=C<$ groups are those which are derived from alpha, beta unsaturated organic acids and, therefore, contain the reactive groups present in these acids. The term "acids" as used herein is intended to include the anhydrides as well as the acids themselves, since the former may be used instead of the acid. The term alpha, beta-unsaturated organic acid as used in the art does not include acids, wherein the unsaturated group is part of an aromatic-acting radical as, for example, phthalic acid, and the same definition is adopted herein.

The resins are preferably produced by the esterification of an alpha, beta unsaturated polycarboxylic acid with a polyhydric alcohol and particularly a glycol. Although esterification of the acid with a polyhydric alcohol is perhaps one of the simplest, convenient ways of obtaining a reactive resin, I am not precluded from using resins otherwise derived from alpha, beta unsaturated organic acids. Reactive resins suitable for my invention are any of those containing a plurality of polymerizably reactive alpha, beta enal groups.

*Preparation of the polymerizable mixture*

A relative resin such as those prepared by the esterification of alpha, beta-unsaturated organic acids and a glycol or other polyhydric alcohol is illustrated with the reactive material containing the group $CH_2=C<$. Upon adding a polymerization catalyst and subjecting the mixture to polymerization conditions such as, for example, heat, light, or a combination of both, a substantially insoluble, substantially infusible resin is obtained.

All of these reactive substances suitable for use according to my invention for reaction with a reactive resin are characterized by the presence of the reactive group $CH_2=C<$ and none of them contains a conjugated carbon-to-carbon double bond. Compounds containing a conjugated system of carbon-to-carbon double bonds are known to react with themselves or with other unsaturated compounds such as the maleic esters by a 1,2–1,4 addition mechanism such as that which has become generally known as the Diels-Alder reaction. On the other hand, compounds such as those used according to the present invention and which contain no conjugated carbon-to-carbon double bonds obviously cannot undergo this type of reaction with the maleic esters. Accordingly, my invention is not directed to the use of unsaturated compounds containing conjugated systems of carbon-to-carbon double bonds. Many substances which contain a carbon-to-carbon double bond conjugated with respect to oxygen are suitable for use according to my invention, since they do not react with unsaturated alkyd resins in an undesirable manner but instead copolymerize or interpolymerize to form substantially infusible, substantially insoluble resins.

The reactive allyl compounds, which may be used, are any of those compounds which contain $CH_2=CH-CH_2-$ group and which do not have a boiling point below about 60° C. Of the allyl compounds which may be used, the allyl esters form a large class, all of which are suitable. The reactive allyl compounds which have been found to be most suitable are those having a high boiling point such as the diallyl esters, e. g., diallyl maleate, diallyl fumarate, diallyl phthalate, and diallyl succinate. Other allyl compounds may be used which are not necessarily high boiling. Substantially insoluble and substantially infusible resins may be prepared by reacting or polymerizing any of the following with a polymerizably reactive resin of the type described herein, i. e., unsaturated alkyd resins containing a plurality of alpha, beta enal groups: allyl alcohol, methyllyl alcohol, allyl acetate allyl lactate, the allyl ester of alpha-hydroxyisobutyric acid, allyl acrylate, allyl methacrylate, diallyl carbonate, diallyl malonate, diallyl oxylate, diallyl succinate, diallyl gluconate, diallyl methylgluconate, diallyl adipate, the diallyl ester of azelaic acid, diallyl sebacate, diallyl tartronate, diallyl tartrate, diallyl silicone, diallyl silicate, diallyl fumarate, diallyl maleate, diallyl mesaconate, diallyl citraconate, diallyl glutaconate, the diallyl ester of muconic acid, diallyl itaconate, diallyl phthalate, diallyl chlorophthalate, the diallyl ester of endomethylene tetrahydrophthalic anhydride, triallyl tricarballylate, triallyl aconitate, triallyl citrate, triallyl phosphate, trimethylallyl phosphate, triallyl silicon, triallyl cyanurate, tetraallyl silicate, and other tetraallyl esters, the diallyl ester of ethylene glycol dicarbonate, diallyl ester of ethylene glycol dimaleate, diallyl ester of ethylene glycol dioxalate, diallyl ester of ethylene glycol diethylene dicarbonate, diallyl ester of ethylene glycol diethylene dimaleate, diallyl ester of diethylene glycol dioxalate, and vinyl hydrocarbons such as styrene, ortho, meta, paramethyl styrene, alpha methyl styrene, 2,4-dimethyl styrene, 2,3-dimethyl styrene, 2,5-dimethyl styrene, isopropenyl toluene, vinyl naphthalene, and the like. Other reactive materials which may be employed are the methyl, ethyl, propyl, butyl, cyclohexyl, cetyl, and other alkyl esters of acrylic and methacrylic acids. Aliphatic vinyl esters may also be used including vinyl acetate, vinyl butyrate, vinyl laureate, vinyl stearate, acrolein, methacrolein, acrylonitrile, methacrylonitrile, vinyl ether and the like.

The polymerization catalysts which may be used with the unsaturated polyester resins include a wide variety of materials such as diacyl peroxides, or, more specifically, benzoyl peroxide, benzoyl peroxide compounded with tricresyl phosphate, technical lauroyl peroxide, 2,4-dichloro benzoyl peroxide compounded with dibutyl phthalate, p-chloro benzoyl peroxide, p-chloro benzoyl peroxide compounded with tricresyl phosphate; aldehyde peroxides such as hydroxyheptyl peroxide, dibenzal diperoxide compounded with tricresyl phosphate; ketone peroxides such as methyl ethyl ketone peroxide in dimethyl phthalate, 1-hydroxycyclohexyl hydroperoxide-1, methyl isobutyl ketone peroxide in dimethyl phthalate, methyl amyl ketone peroxide; alkyl hydroperoxides such as tertiary butyl hydroperoxide; alkyl peresters such as ditertiary butyl diperphthalate, tertiary butyl perbenzoate; alkyl acid peresters such as tertiary butyl permaleic acids, tertiary butyl perphthalic acid. Other catalysts may be used such as the acidic peroxides, e. g., phthalic peroxide, succinic peroxide, benzoylacetic peroxide, lauric peroxide, stearic peroxide, oleic peroxide, and terpene oxides, e. g., ascaridole. Still other polymerization catalysts might be used in some instances, such as soluble cobalt salts (particularly the lineoleate and naphthenate), p-toluene sulfonic acid, aluminum chloride, boron trifluoride, and the like.

It is generally customary to use as a concentration of catalyst a comparatively small amount, that is from about 1 part catalyst per 1000 parts of reactive mixture to about 2 parts per 100 parts of reactive mixture. If an inhibitor be present, up to 5% or even more of catalyst may be necessary according to the concentration of the inhibitor. Where these compositions are used as molding and laminating materials which contain high concentrations of substances which act as inhibitors, e. g., wood flour, the concentration of catalyst necessary to effect polymerization may be well above 5%.

The unsaturated alkyd resins employed in the practice of the process of my invention are preferably those having an acid number of not greater than 50, although in some cases, resins having an acid number as high as 100 may be desirable. Generally, the acid number should be as low as possible, but this is sometimes controlled by practical considerations of operation, such as time, temperature, and economy.

The resins should be so formulated that the carboxyl groups of the acids are reacted with the theoretical molal equivalent of the hydroxy groups of the alcohols. In this connection, it is to be noted that the hydroxyl groups of modifying alcohols as well as the carboxyl groups of modifying acids should be included with the hydroxyl groups of the carboxyl groups of the principal reactants, the polyhydric alcohol and the alpha, beta-unsaturated polycarboxylic acid, respectively.

When glycols are reacted with dicarboxylic acids, it is preferable that the glycol be present in a molal ratio to the acid of not less than 1:2 and that the molal ratio of monohydric alcohol to dicarboxylic be not greater than 1:1. In most cases, it has been found that a molal ratio of monohydric alcohol to dicarboxylic acid of 1:6 produces the best results. The same general rules apply when polyhydric alcohols, other than the glycols, are used such as pentaerythritol, dipentaerythritol or polyallyl alcohols or when other polycarboxylic acids having more than 2 carboxylic groups are used. If it be desirable to introduce lower alkyl groups into the resin, this may be done by using maleic esters of monohydric alcohols, e. g., ethyl maleate. The alkyl esters will then be united with the resin by polymerization. This could not be accomplished with the saturated type of alkyd resin, e. g., phthalic acid esters or polyhydric alcohols.

The preparation of the reactive resins is illustrated in the following examples, wherein the reactants are given in parts by weight.

*Preparation of Resin A*

98 parts of maleic anhydride are reacted with about 10% in excess of equimolecular proportions of ethylene glycol (68 parts) at a temperature of about 170–175° C. An excess of ethylene glycol is preferred because of its high volatility. The mixture is continuously agitated and carbon dioxide is introduced into the reaction chamber during the reaction, thereby blanketing the surface of the reactants. After 8 to 12 hours a clear water-white resin is produced with an acid number of 35–50.

Resin A is prepared by mixing the ethylene glycol maleate resin, as prepared hereinabove, with various concentrations of diallyl maleate. The proportions vary between 10% of the ethylene glycol maleate resin to 90% of the diallyl maleate; 30% resin, 70% diallyl maleate; 50% ethylene glycol maleate resin and 50% diallyl maleate; 70% ethylene glycol maleate resin and 30% diallyl maleate; 90% ethylene glycol maleate resin and 10% diallyl maleate. These mixtures comprise the composition of Resin A.

The following results were attained after curing Resin A in its various proportions for 4 days at 58° C.

| Resin percent | Diallyl maleate percent | Result |
| --- | --- | --- |
| 10 | 90 | Clear—soft. |
| 30 | 70 | Clear—semi-hard, gelled after 24 hours. |
| 50 | 50 | Do. |
| 70 | 30 | Do. |
| 90 | 10 | Do. |

Similar results are obtained substituting diallyl fumarate and diallyl phthalate for the diallyl maleate.

*Preparation of Resin B*

106 parts of diethylene glycol and 98 parts of maleic anhydride were separately vacuum-distilled into a reaction chamber, and the mixture was stirred mechanically while carbon dioxide gas was introduced over the surface of the resin to exclude air and to remove water that was formed in the esterification. The reaction was conducted at 170° C. for a period of from 8–12 hours, yielding a resin of acid number of 35–50.

The diethylene glycol maleate resin, with an acid number of 50 as produced hereinabove, is mixed with diallyl phthalate in a plurality of ratios, based on percentages of the diethylene glycol maleate resin and diallyl phthalate totaling 100% in the mixture. The proportions of the resin to the polymerizable monomer vary between 10% of the former to 90% of the latter to 60% of the former to 40% of the latter. Each of these mixtures is identified as Resin B, containing about 0.4% of benzoyl peroxide. In order to illustrate the contrast between the use of the resin with the monomeric material, and the monomeric material alone, a plurality of samples of Resin B with varying ratios of resin to monomer were heated at 44° C. for 24 hours, and then at 100° C. for 3 hours, with the results shown hereinbelow.

| Resin, percent | Diallyl phthalate, percent | Result | |
| --- | --- | --- | --- |
| | | 24 Hours | 27 Hours |
| 0 | 100 | Liquid | Liquid. |
| 10 | 90 | Slightly opaque gel | Slightly opaque gel. |
| 20 | 80 | ----do---- | Do. |
| 30 | 70 | ----do---- | Do. |
| 40 | 60 | ----do---- | Do. |
| 50 | 50 | Clear gel | Clear gel. |
| 60 | 40 | ----do---- | Do. |

*Resin C*

A resin formed by the reaction of 1 mol of triethylene glycol with 1 mol of a mixture containing fumaric acid (25%) and phthalic anhydride (75%) was mixed with ethylene glycol maleate resin in various proportions. Sixty parts of these mixed resins were mixed with 40 parts of a diallyl ester, 0.05 part of cobalt naphthenate in toluol, and 0.2 part of benzoyl peroxide in dioxan. This composition is identified as Resin C. The following results were obtained when Resin C was treated as indicated below:

| Triethylene glycol phthalic-fumaric resin | Ethylene glycol maleate | Diallyl maleate | Result at 90° C. at — | |
| --- | --- | --- | --- | --- |
| | | | 11 minutes | 20 minutes |
| Parts | Parts | Parts | | |
| 60 | 0 | 40 | Tack-free | Dry. |
| 30 | 30 | 40 | ----do---- | Dry. |
| 10 | 50 | 40 | Tacky | Dry. |

It has been pointed out hereinabove that the phenolic resins which are to be used as modifiers for these polyester resins, for the purpose of eliminating the tendency of these polyester resins to crater when applied as surface-coating materials, are p-tertiary butyl phenol-formaldehyde resin, p-secondary butyl phenol-formaldehyde resin, and o-tertiary amyl phenol-formaldehyde resin, prepared under acid conditions by use of an acid catalyst, or prepared under alkaline conditions by use of an alkaline catalyst, in which latter process the methylol substituted phenol-formaldehyde resins result. Actually, other aldehydes than formaldehyde may be used in the preparation of these phenolic resins, such as paraformaldehyde, acetaldehyde, benzaldehyde, furfural propionaldehyde, and the like. In order to illustrate the procedure for the preparation of these phenolic resins to be used in the practice of the process of the instant invention, the following examples are set forth for the purpose of illustration only. All parts are parts by weight.

Resin D

Charge 300 parts of p-tertiary butyl phenol into a suitable reaction chamber equipped with thermometer and agitator and heat to about 95° C. While agitating the heated phenol, add 53 parts of a paraformaldehyde and 45 parts of oxalic acid. Heat the reaction mixture to reflux and hold the mixture at that temperature for about 4 hours. The reaction mixture is then subjected to steam distillation at a temperature of about 110–180° C., and the steam distillation is continued until no further phenol can be removed. After the steam distillation has been completed, a vacuum may be used to remove the final traces of water. The resin is clear and brittle when cool and is ready for use in the formulations of the present invention.

Resin E

Introduce into a suitable reaction chamber equipped with thermometer and stirrer, 600 parts of a p-tertiary butyl phenol, 486 parts of a 37% aqueous formaldehyde solution and 250 parts of naphtha. The ingredients are stirred to effect complete mixing, and 300 parts of a 10% sodium hydroxide solution are added, and the reaction mixture is then heated to reflux (85–90° C.). The reaction mixture is held at reflux until it becomes cloudy. The pH is adjusted to 4–5 with dilute hydrochloric acid. The reaction chamber may then be filled with water and the mixture permitted to separate into two immiscible layers, whereupon the lower aqueous layer is removed and the upper organic layer is prepared for steam distillation. The organic layer is then subjected to steam distillation in order to remove any free p-tertiary butyl phenol. This steam distillation can be accomplished by keeping the temperature at about 110° C. while passing steam through the resin. After the steam distillation, a vacuum may be used to remove the final traces of water. The resultant resin will be clear and comparatively low melting.

In order to prepare solutions of the phenolic resin in the unsaturated polyester resins, it is necessary only to pulverize the phenolic resin when it is a solid such as the one prepared according to the process of Resin D and said pulverized resin may be added to the unsaturated polyester resins, such as that prepared according to the process of Resin A, with continuous agitation. This mixture is heated on a water bath (50–60° C.) until a solution of the phenol resin in the unsaturated polyester resin is obtained. This resin mixture is cooled and stored in a cool place until ready for use. When it is desired to use the liquid phenolic resin such as that prepared according to the process set forth in Resin E, it is generally only necessary to add the liquid resin to the polyester resin with continuous agitation until a complete solution is obtained. By warming the mixture on a water bath, one may hasten the solution of the phenolic resin in the polyester resin. As a still further modification of the addition of the phenolic resin, one may add the phenolic resin, prepared according to the processes of either Resin D or Resin E, to the unsaturated polyester resin during the preparation of the latter. If this modification is desired, the phenolic resin may be added after the monomeric material, such as diallyl phthalate, has been added to the unsaturated alkyd, blended for a period of time, and cooled to 110–120° C. At this point, the phenolic resin may be added and said resin will dissolve as the polyester resin is further cooled to room temperature. As a still further modification of the incorporation of the phenolic resin into the polyester resin, one may dissolve said phenolic resin in the monomer, such as styrene, prior to its addition to the unsaturated alkyd resin. Heating may be required to bring about the solution of the phenolic resin in these monomers, especially those having lower solvent power for this material. A still further modification of the process of incorporating the phenolic resin into the polyester resin can be accomplished where it is desired to use the polyester resin in the form of a solution in a suitable solvent, such as toluene, ethyl alcohol, or ethyl acetate. In this instance, the phenolic resin may be dissolved in a suitable solvent and added to the unsaturated polyester solution with agitation until the solution is completed.

The following examples are set forth for the purpose of illustrating the formulations for coating compositions prepared in accordance with my discovery. All parts are parts by weight.

Example 1

| | Parts |
|---|---|
| Unsaturated polyester (Resin A) | 100 |
| p - Tertiary butyl phenol - formaldehyde (Resin E) | 0.75 |
| Cobalt (as 6% naphthenate) | 0.33 |
| Methyl amyl ketone peroxide | 1.66 |

The above constituents are mixed thoroughly to give a clear solution. A suitable solvent such as ethyl acetate, toluene, butyl Cellosolve may be added to give the desired application viscosity. The coating composition thus prepared may be applied but any conventional application method, such as spray, roller coat, knife, doctor blade or brush. When this coating composition is applied to a substratum base such as glass, metal, wood, and the like, and cured at temperatures varying between about 150° F. and 300° F. for periods of time varying between about 60 minutes at the lower temperature to about 10 minutes at the higher temperature, one obtains a hard, tack-free, clear film, which is completely free or very substantially free of all crater-like defects.

Example 2

| | Parts |
|---|---|
| Unsaturated polyester resin (Resin B) | 100 |
| p-Tertiary butyl phenol-formaldehyde (Resin E) | 0.75 |
| Titanium dioxide | 100 |
| Solvent (ethyl acetate) | 55 |

The above constituents were ground in a pebble mill for about 36 hours and thereafter 0.33 parts of cobalt (as 6% cobalt naphthenate), and 1.66 parts methyl amyl ketone peroxide were blended into the initial mixture and additional solvent is added to give the coating material the desired application viscosity. When this coating material is applied to a substratum base and cured at temperatures ranging from about 150° F. to 300° F., for periods of time varying between from about 60 minutes at the lower temperature, to about 10 minutes at the higher temperature, a white gloss enamel surface is obtained which is completely free or very substantially completely free of all crater-like defects.

The above formulation may be varied in a number of different ways, by the addition of modifying materials, such as pigments, fillers, catalysts, driers, and the like.

Example 3

| | Parts |
|---|---|
| Unsaturated polyester (Resin C) | 100 |
| p-Tertiary butyl phenol-formaldehyde (Resin E) | 0.75 |
| Titanium dioxide | 133 |
| Lithopone | 133 |
| Talc | 133 |

These constituents may be blended and prepared in the same manner as that set forth hereinabove in Example 2 to produce a white primer surface, and when so used is completely free, or very substantially completely free of all crater-like defects.

In the formulation of the phenolic resin to be used to modify the polyester resins in keeping with the instant invention, it is desired to use mol ratios of phenol to formaldehyde which are within the range of 1:0.5 to 1:2 respectively. It is preferred, however, to control the mol ratios of the acid catalyzed phenol:formaldehyde resin within the range of 1:0.5 to 1:1.2 respectively, but optimum results can be obtained by using a mol ratio of 1:0.7 to 1:0.9 phenol to formaldehyde respectively. The alkaline catalyzed phenol-formaldehyde resins should have a mol ratio of 1:1 to 1:2 respectively. The amount of phenolic resin required to effect this improvement, which I have discovered, is within the range of 0.75% to about 1.25% by weight, based on the total weight of the polyester resin selected. This range of percentages gives optimum results. However, it is possible to use as little as 0.01% of the phenolic resin by weight based on the weight of the polyester resin, but when this amount is used, the improvements in the surface characteristics are comparatively slight. By using percentages of 0.05% and 0.10%, one effects increasingly improved characteristics. It is not until one reaches 0.25% phenolic resin that one begins to realize the marked effectiveness of result, which these particular phenolic resins are capable of producing. This effectiveness increases to a content of 1%. Thereafter, and up to 1.25%, the increase in effectiveness is not appreciable, because the polyester films produced with this amount of modifier have already reached substantially optimum surface conditions. When the amount of the phenolic resin exceeds 1.25%, by weight, based on the total weight of the polyester resin, signs of incompatibility begin to appear in some polyester resins. In other polyester resins, it is possible to use up to 5% of the phenolic resin without experiencing any incompatibility. Above 5%, striations sometimes begin to appear, and incompatibility is one of the important factors to be considered in determining the maximum amount of phenolic resin which may be incorporated into these polyester resins, while producing the desired result, namely, the elimination of cratering defects from these polyester resin films. As long as one continues to find compatibility between the phenolic resins and the polyester resins, there is no upper limit to the amount of phenolic resin which may be added. However, for optimum results, it is generally sufficient to add only 0.25% to 1.25% by weight of the phenolic resin, based on the total weight of polyester resin used.

I claim:

1. A surface-coating composition, capable of producing, on curing, a crater-free film, comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b), and (2) 0.25%–1.25% by weight of a p-secondary butyl phenol-formaldehyde resin, based on the total weight of said polyester resin, and wherein said alkyd resin contains a plurality of polymerizably reactive alpha, beta enal groups.

2. A surface-coating composition, capable of producing, on curing, a crater-free film comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b), and (2) 0.25%–1.25% by weight of an o-tertiary amyl phenol-formaldehyde resin, based on the total weight of said polyester resin, and wherein said alkyd resin contains a plurality of polymerizably reactive alpha, beta enal groups.

3. A surface-coating composition, capable of producing, on curing, a crater-free film, comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b), and (2) 0.25%–1.25% by weight of an alkaline catalyzed p-secondary butyl phenol-formaldehyde resin, based on the total weight of said polyester resin, and wherein said alkyd resin contains a plurality of polymerizably reactive alpha, beta enal groups.

4. A surface-coating composition, capable of producing, on curing, a crater-free film, comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b) and (2) 0.25%–1.25% by weight of a p-tertiary butyl phenol-formaldehyde resin, based on the total weight of said polyester resin, and wherein said alkyd resin contains a plurality of polymerizably reactive alpha, beta enal groups.

5. A surface-coating composition capable of producing, on curing, a crater-free film, comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b), and (2) 0.25%–1.25% by weight of an alkaline catalyzed p-tertiary butyl phenol-formaldehyde resin, based on the total weight of said polyester resin, and wherein said alkyd resin contains a plurality of polymerizably reactive alpha, beta enal groups.

6. A surface coating composition capable of producing, on curing, a crater-free film comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b) and (2) 0.01%–5% by weight of a phenol-formaldehyde resin, based on the total weight of said polyester resin, wherein the phenol is selected from the group consisting of p-tertiary butyl phenol, p-secondary butyl phenol and o-tertiary amyl phenol and wherein said alkyd resin contains a plurality of polymerizably reactive alpha, beta enal groups.

7. A surface coating composition capable of producing, on curing, a crater-free film comprising a compatible blend of (1) a polyester resin composition comprising a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b) and (2) 0.25%–1.25% by weight of a phenol-formaldehyde resin, based on the total weight of said polyester resin, wherein the phenol is selected from the group consisting of p-tertiary butyl phenol, p-secondary butyl phenol and o-tertiary amyl phenol and wherein said alkyd resin contains a plurality of polymerizably reactive alpha, beta enal groups.

8. A surface coating composition capable of producing, on curing a crater-free film comprising a compatible blend of (1) a polyester resin composition compriisng a polymerizable mixture of (a) a polymerizably reactive unsaturated alkyd resin, (b) a compatible polymerizably reactive material having at least one $CH_2=C<$ group and (c) a catalyst for accelerating the copolymerization of (a) and (b) and (2) 0.25%–1.25% by weight of a phenol-formaldehyde resin, based on the total weight of said polyester resin, wherein the phenol is selected from the group consisting of p-tertiary butyl phenol, p-secondary butyl phenol and o-tertiary amyl phenol and wherein said alkyd resin contains a plurality of polymerizably reactive alpha, beta enal groups.

JOHN F. DAVIS.

References Cited in the file of this patent

UNITED STATES PATENTS

| Number | Name | Date |
| --- | --- | --- |
| 2,166,856 | Blaikie | July 18, 1939 |
| 2,330,333 | Brubaker | Sept. 28, 1943 |
| 2,337,873 | D'Alelio | Dec. 28, 1943 |
| 2,443,738 | Kropa | June 22, 1948 |